(12) United States Patent
Kataoka et al.

(10) Patent No.: US 8,346,057 B2
(45) Date of Patent: Jan. 1, 2013

(54) RECORDING/READING APPARATUS, METHOD OF GENERATING TAG LIST FOR RECORDING/READING APPARATUS, AND CONTROL UNIT FOR RECORDING/READING APPARATUS

(75) Inventors: Hideo Kataoka, Tokyo (JP); Hajime Aoyama, Ageo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 61 days.

(21) Appl. No.: 13/102,955

(22) Filed: May 6, 2011

(65) Prior Publication Data
US 2012/0027381 A1    Feb. 2, 2012

(30) Foreign Application Priority Data
Jul. 30, 2010    (JP) ................................ 2010-172847

(51) Int. Cl.
| | |
|---|---|
| *H04N 9/80* | (2006.01) |
| *H04N 5/93* | (2006.01) |
| *H04N 5/76* | (2006.01) |
| *G11B 27/00* | (2006.01) |
| *H94N 9/70* | (2006.01) |
| *H04N 5/932* | (2006.01) |
| *H04N 5/935* | (2006.01) |
| *H04N 5/931* | (2006.01) |
| *H04N 7/16* | (2006.01) |
| *H04N 7/20* | (2006.01) |
| *H04N 7/173* | (2006.01) |

(52) U.S. Cl. ........ 386/241; 386/207; 386/201; 386/239; 386/248; 386/278; 386/295; 386/300; 725/62; 725/63; 725/64; 725/65; 725/131; 725/133

(58) Field of Classification Search .................. 386/207, 386/201, 239, 241, 248, 278, 295, 300; 725/62, 725/63, 64, 65, 66, 131, 133
See application file for complete search history.

(56) References Cited

U.S. PATENT DOCUMENTS

| | | | |
|---|---|---|---|
| 5,790,743 A | | 8/1998 | Sugiyama et al. |
| 5,903,702 A | | 5/1999 | Sugiyama et al. |
| 6,026,434 A | * | 2/2000 | Kubota et al. ................. 725/105 |

(Continued)

FOREIGN PATENT DOCUMENTS
EP    1 628 476 A2    2/2006
(Continued)

OTHER PUBLICATIONS

European Search Report in EP App. No. 11156931.5-2202 dated Jul. 8, 2011 in 6 pages.

(Continued)

*Primary Examiner* — Daquan Zhao
(74) *Attorney, Agent, or Firm* — Knobbe, Martens, Olson & Bear, LLP

(57) ABSTRACT

According to one embodiment, there is provided a control block including a read control processor for reading designated content, a time information processor for processing time information. A controller returns, to a user terminal, a response signal, and information indicating a second absolute time point when an operation is executed in response to a request signal generated by the user terminal at a first absolute time point. The controller stores time difference information indicating a time difference between the first and the second absolute time points. When responding to a further request signal sent from the requester via the network, the controller sets, as tag time information, time information obtained by correcting, using the time difference information, a current relative time period for which the designated content is read.

9 Claims, 5 Drawing Sheets

U.S. PATENT DOCUMENTS

| | | | |
|---|---|---|---|
| 6,526,070 B1* | 2/2003 | Bernath et al. | 370/509 |
| 2007/0094703 A1 | 4/2007 | Nygaard | |
| 2007/0186261 A1* | 8/2007 | Geile et al. | 725/126 |
| 2008/0089661 A1 | 4/2008 | Yamagishi | |
| 2008/0089663 A1* | 4/2008 | Lee et al. | 386/83 |
| 2008/0104230 A1* | 5/2008 | Nasuto et al. | 709/224 |
| 2009/0042607 A1 | 2/2009 | Adachi et al. | |
| 2009/0063739 A1* | 3/2009 | Weddle | 710/110 |
| 2009/0103901 A1* | 4/2009 | Endo et al. | 386/124 |
| 2009/0153309 A1* | 6/2009 | Kim et al. | 340/10.51 |
| 2009/0235317 A1* | 9/2009 | Igarashi | 725/82 |
| 2010/0005501 A1* | 1/2010 | Stokking et al. | 725/115 |
| 2010/0088411 A1* | 4/2010 | Litofsky et al. | 709/224 |
| 2010/0220976 A1* | 9/2010 | Ellis et al. | 386/83 |
| 2010/0238820 A1* | 9/2010 | Yokoyama | 370/252 |
| 2011/0210887 A1* | 9/2011 | Eisen et al. | 342/357.25 |
| 2011/0252087 A1* | 10/2011 | Zuzga et al. | 709/203 |
| 2011/0296048 A1* | 12/2011 | Knox et al. | 709/231 |
| 2012/0041878 A1* | 2/2012 | Yim | 705/44 |

FOREIGN PATENT DOCUMENTS

| | | |
|---|---|---|
| JP | H04-028074 | 1/1992 |
| JP | H08-069683 | 3/1996 |
| JP | H10-075413 | 3/1998 |
| JP | 2001-244932 | 9/2001 |
| JP | 2002-010180 | 1/2002 |
| JP | 2008-098960 | 4/2008 |

OTHER PUBLICATIONS

Notice of Reasons for Rejection mailed by the Japan Patent Office on Jul. 19, 2011 in the corresponding Japanese patent app. No. 2010-172847 in 9 pages.

* cited by examiner

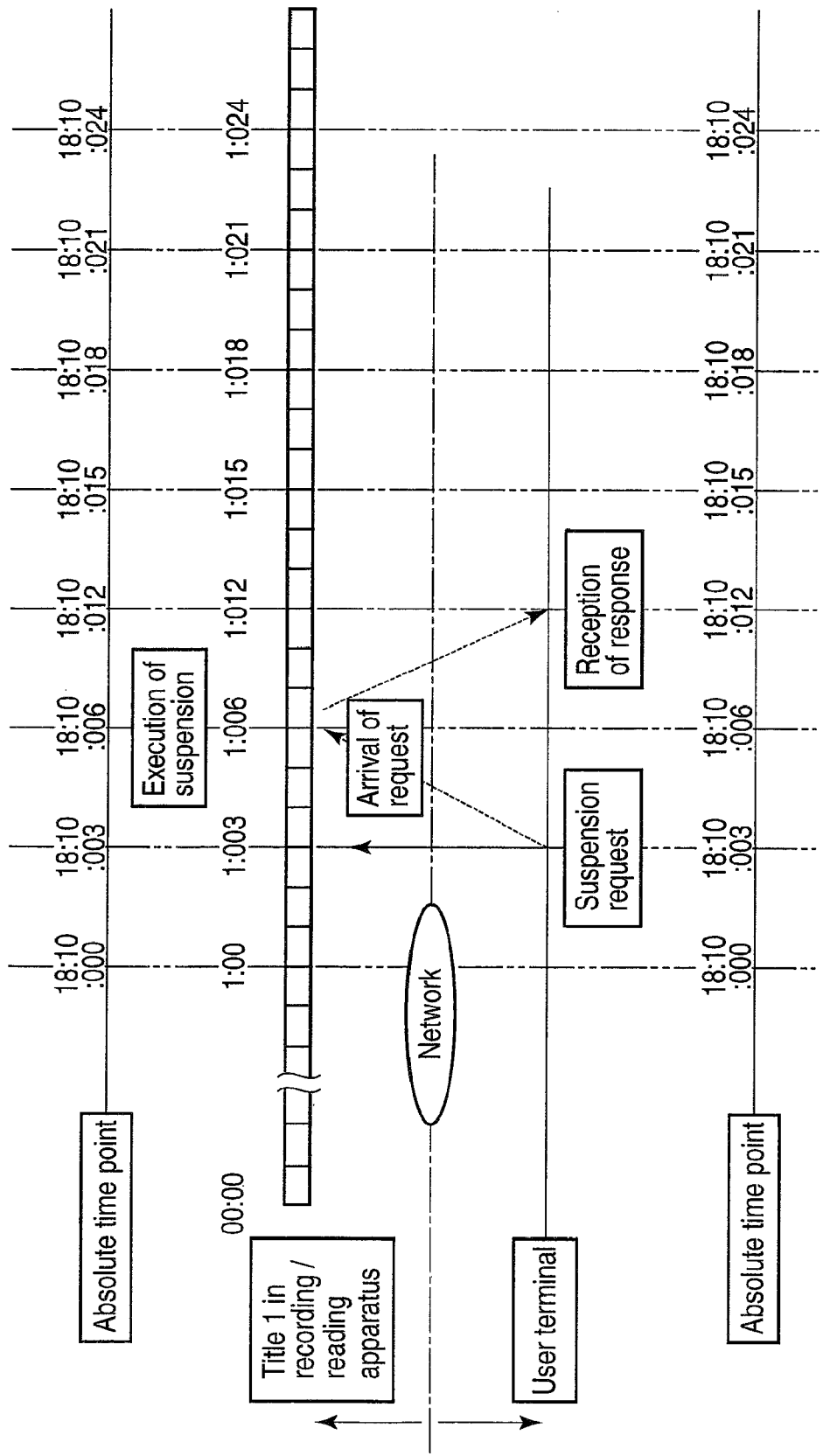
F I G. 2

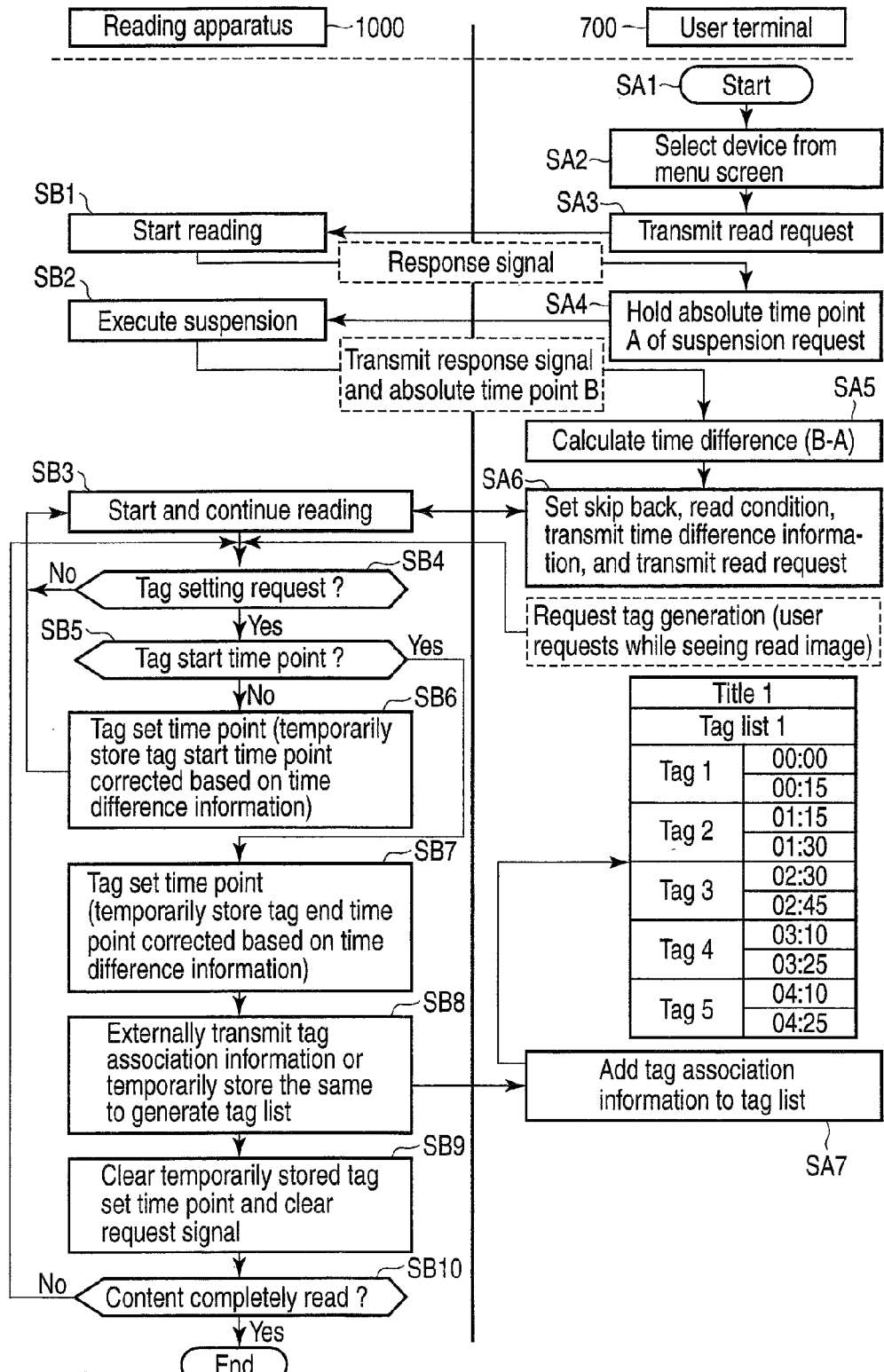
F I G. 3

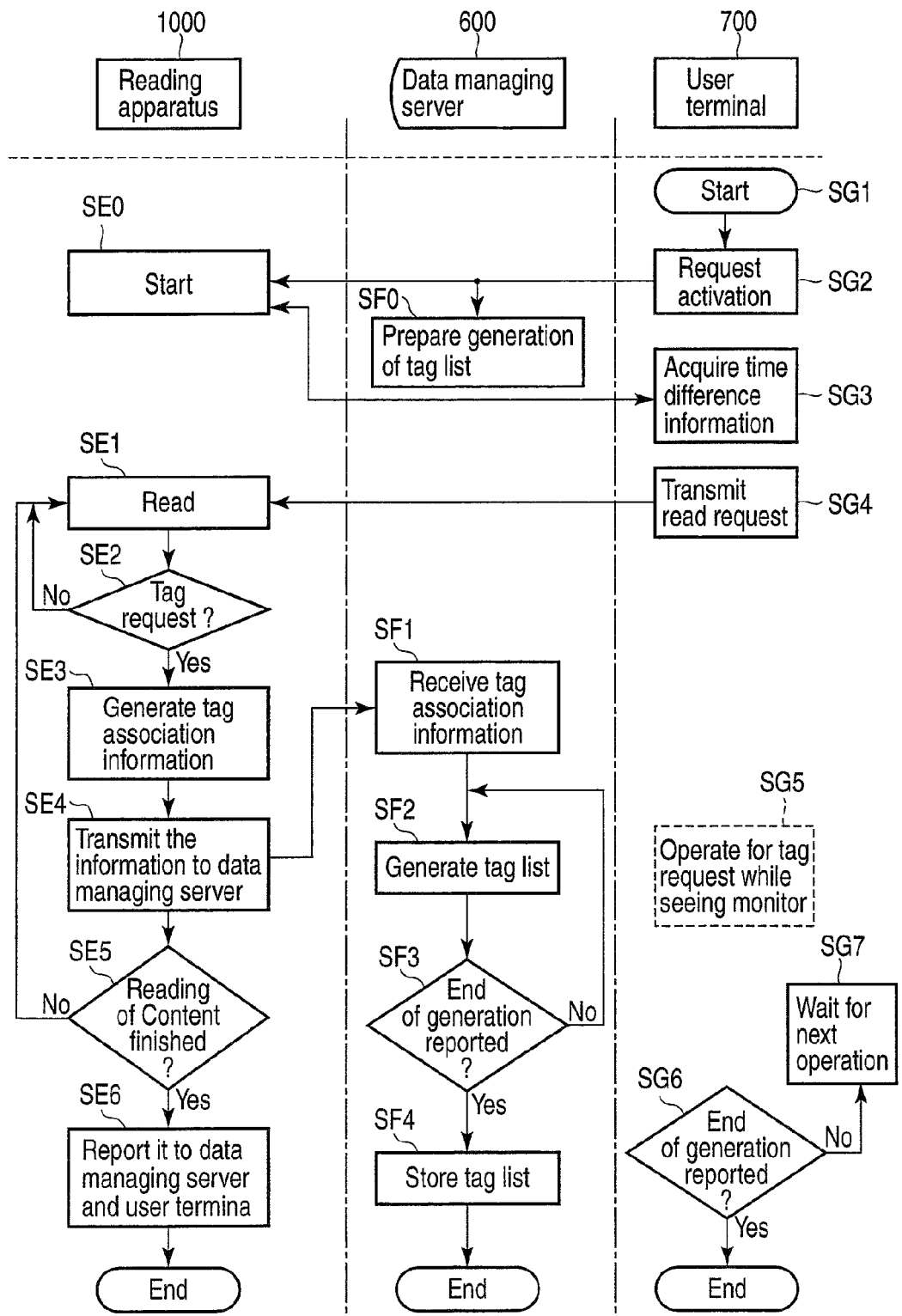
F I G. 4

RECORDING/READING APPARATUS, METHOD OF GENERATING TAG LIST FOR RECORDING/READING APPARATUS, AND CONTROL UNIT FOR RECORDING/READING APPARATUS

CROSS-REFERENCE TO RELATED APPLICATIONS

This application is based upon and claims the benefit of priority from Japanese Patent Application No. 2010-172847, filed Jul. 30, 2010; the entire contents of which are incorporated herein by reference.

FIELD

Embodiments described herein relate generally to a recording/reading apparatus, a method of generating a tag list for a recording/reading apparatus, and a control unit for a recording/reading apparatus.

BACKGROUND

Conventional information recording/reading apparatuses incorporate automatic chapter generating means for automatically generating chapters. When a recording/reading apparatus automatically generates a chapter, it is set in a chapter setting mode. Subsequently, the recording/reading apparatus reads content. At this time, a read signal is displayed on a monitor. When a user wants to set a chapter during viewing the monitor, they operate a remote controller key. In the recording/reading apparatus, a suspension function is executed at time t1 when the key operation is performed, to thereby set chapter c1 at the suspended portion of a title.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view useful in explaining an operation example of the embodiment, and illustrating the relationship between the chapter skip operation of the recording/reading apparatus and an operation of an external terminal for acquiring information;

FIG. 3 is an exemplary view useful in explaining another operation example of the embodiment, and illustrating the relationship between the information transmission operation of the recording/reading apparatus and an operation of the external terminal for command transmission and information acquisition;

FIG. 4 is an exemplary view useful in explaining yet another operation example of the embodiment, and illustrating the relationship between the information transmission operation of the recording/reading apparatus and an operation of the external terminal for command transmission and information acquisition.

DETAILED DESCRIPTION

Figure 1:
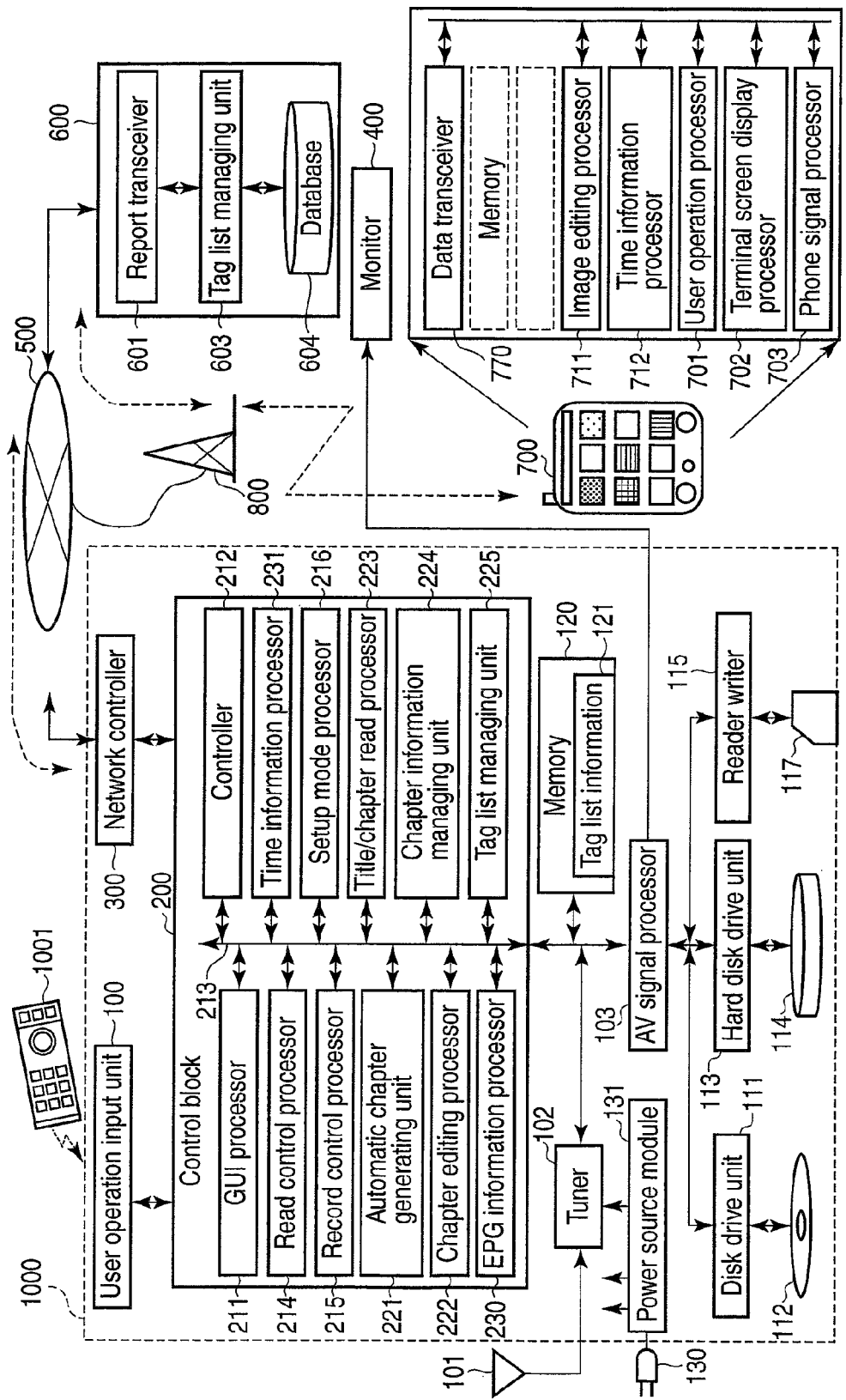
FIG. 1 is an exemplary block diagram illustrating a configuration according to an embodiment.

Various embodiments will be described hereinafter with reference to the accompanying drawings.

In general, according to one embodiment, in accordance with an aspect of the disclosure, not simple separation information, such as a chapter mark mainly used as a cue, but tag association information that designates at least a certain zone (defined by start and end points) of content can be generated for the content. In this case, the tag association information can be generated in an accurate position in the content.

In accordance with another aspect of the disclosure, the tag association information can be constructed in a device external to a recording/reading apparatus according an embodiment, thereby enabling a plurality of users to use the information.

The recording/reading apparatus according to the embodiment comprises a control block 200 including a read control processor 214 for reading designated content; a time information processor 231 for processing time information. A controller 212 in the control block 200 returns, to a user terminal 700, a response signal, and information indicating a second absolute time point (B) when an operation is executed in response to a request signal generated by the requester at a first absolute time point (A) and sent via a network 500. The controller stores time difference information (B-A) indicating a time difference between the first and the second absolute time points. When responding to a further request signal sent from the requester via the network, the controller sets, as tag time information, time information obtained by correcting, using the time difference information, a current relative time period for which the designated content is read.

The embodiment will now be described in more detail with reference to the accompanying drawings. In FIG. 1, reference number 1000 denotes a recording/reading apparatus. The recording/reading apparatus 1000 may be used solely, or be connected to a television receiver. Reference number 1001 denotes a remote controller for operating the recording/reading apparatus 1000.

An operation signal from the remote controller 1001 is received by a user operation input unit 100, and interpreted by a controller (main controller) 212 contained in a control block 200. If the operation signal from the remote controller 1001 is a command for power on, a power supply module 131 connected to a plug 130 is activated. As a result, the main power supply of the recording/reading apparatus 1000 is turned on. The auxiliary power supply of the apparatus 1000 is always kept in the ON state for receiving, for example, a remote controller signal.

Assume here that the operation signal from the remote controller 1001 indicates a command for selecting a broadcast signal, i.e., selecting a TV program. A high-frequency signal is input to a tuner 102 via an antenna 101. The tuner 102 receives and demodulates a signal corresponding to a designated TV program, and supplies the resultant signal to an AV processor 103. The AV processor 103 selectively executes, on the input signal, various types of processing (such as scanning line conversion, resolution conversion, luminance correction, color phase adjustment and noise reduction processing), and supplies an output signal to a monitor 400.

The control block 200 comprises a graphic user interface (GUI) processor 211, and an electronic program guide (EPG) information processor 230. The EPG information processor 230 can acquire electronic program guide information via a network or the tuner 102. The acquired electronic program guide information is stored in, for example, a memory 120, and is updated regularly. When a user wants to see a program table, they operate the remote controller 1001 to request a menu. Upon receiving the request, the controller 212 instructs the GUI processor 211 to output a menu image. The GUI processor 211 reads menu image data form the memory 120, and supplies it to the AV signal processor 103. As a result, the menu image is displayed on the monitor 400. The menu image includes an item (icon) for program table display. When the user operates a cursor to select the program table display item (icon) and press a determination button, the GUI processor 211 reads the electronic program guide information from the memory 120 and supplies it to the AV signal processor 103. The AV signal processor 103 processes the input electronic program guide information, and outputs a program table to the monitor 400. As a result, the program table is displayed on the monitor 400. When the user moves the cursor over the program table to select a desired program name (icon) and press the determination button, a program corresponding to the selected program name is received and displayed.

Also when the user reserves and programs the recording of a TV program, they operate an operation key for programming the recording of a TV program. Also in this case, the program table is displayed on the monitor 400, and the user moves the cursor over the program table to select a desired program and press the determination button, whereby the recording of the desired program is reserved and programmed. At this time, a recording destination medium, to which the desired program is to be recorded, can be designated. The destination medium is, for example, an optical disk (such as a DVD and a blue-ray disk) 112, a hard disk 114 and a memory card 117. When data is recorded on or read from the optical disk 112, the control block 200, the disk drive unit 11 and the AV signal processor 103 work together. Similarly, when data is recorded into or read from the memory card 117, the control block 200, a reader writer 115 and the AV signal processor 103 make a combination work together.

When access to the above-mentioned recording media is controlled to execute read processing, a read control processor 214 incorporated in the control block 200 performs total control. On the other hand, when record processing is executed, a record control processor 215 incorporated in the control block 200 performs total control. For instance, the read and record control processors 214 and 215 execute control of operation timing between the AV signal processor 103, and the disk drive unit 111, the hard disk 114 or the reader writer 115. When reading or recording is performed, the read control processor 214 or the record control processor 215 controls reading or recording in accordance with a reading mode or a recording mode set in a setup mode processor 216. In the case of reading, the setup mode includes a double-speed reading mode, a resolution change mode and an aspect ratio setting mode. In the case of recording, the setup mode includes a resolution setting mode and a recording speed setting mode.

The control block 200 further comprises an automatic chapter generating unit 221, a chapter editing unit 222, a title/chapter read processor 223, a chapter information managing unit 224, and a tag list managing unit 225.

The automatic chapter generating unit 221 can set chapter separation information in arbitrary positions in content (e.g., positions corresponding to the start and end of a commercial, or positions detected at regular intervals). For instance, information on positions corresponding to the start and end of a commercial is generated as time information indicating the time periods elapsing from the start of each TV program. The elapsed time information (chapter information) is managed in the form of a table by the chapter information managing unit 224 along with a title name with chapters. The chapter information is stored in the memory 120 along with, for example, the title name.

In the automatic chapter generating unit 221, a chapter may be generated when a TV program (content) corresponding to a broadcast signal is received and recorded, or when a TV program (content), which is already received and recorded in a recording medium, is read from the recording medium. In any case, when chapter information is generated, the user designates chapter automatic generation via a menu screen. The setup mode processor 216 manages whether a chapter automatic generation mode is set. The user can edit chapters. For instance, when a chapter editing item is selected on the menu screen, the chapter editing unit 222 incorporated in the control block 200 is activated. The chapter editing unit 222 controls the memory 120 to display title names with chapter information on the monitor 400. If the user designates one of the title names, the chapter editing unit 222 refers to the chapter information corresponding to the title name. After that, the chapter editing unit 222 generates, for example, a thumbnail corresponding to the start portion of each chapter, and a thumbnail corresponding to the end portion of each chapter, and controls the recording medium, the AV signal processor 103, the memory 120, etc., to display the thumbnails on the monitor 400. This enables the user to designate a thumbnail or a chapter, or to execute editing, such as deletion of a chapter, or combining chapters, using the cursor while viewing the monitor 400.

The control block 200 further comprises the tag list managing unit 225. The "tag" is defined as image period designating time information indicating, for example, the start and end times of content. As a short image period, a period of one frame or a period of several tens frames may be defined. The image period is not limited to the short one, but may be defined as a longer period (e.g., 3 or 6 minutes).

Various methods can be used to generate tag information. For instance, there is a method of designating a tag identification name (it may be a tag list name, or a chapter name, or another identification name input as text data) and a tag generation interval (time interval). The time interval ranging from the start of a tag to the end of the tag may be designated. Further, there is a method of generating a tag at the leading part of a chapter. The tag list managing unit 225 collects thus-generated tags and generates tag list information (including pairs of tag information items). The tag list managing unit 225 transfers the generated tag list as tag list information to the memory 120 and stores the same in the memory 120.

The control block 200 also incorporates time information processor 231. The time information processor 231 stores time difference information, described later, and corrects a time difference in operation between a user terminal (or a requester) 700 and the recording/reading apparatus 1000.

The recording/reading apparatus 1000 is connected to a network 500 via a network controller 300. The network may be a home network or an external network. A data managing server 600 is connected to the network 500, and a base station 800 is also connected to the network 500. The base station 800 and the user terminal 700 can communicate with each other. The user terminal 700 can function as, for example, a mobile phone.

The user terminal 700 can communicate with the recording/reading apparatus 1000. In this case, the user terminal 700 and the recording/reading apparatus 1000 may communicate with each other via the base station 800, or may directly communicate with each other using a transceiver incorporated in the recording/reading apparatus 1000.

The data managing server 600 can communicate with the recording/reading apparatus 1000 connected to the network, and with the user terminal 700. The data managing server 600 may be a set top box or an external remote server. The data managing server 600 comprises a report transceiver 601, a tag list managing unit 603 and a database 604. The tag list managing unit 603 manages tag information, sent from the recording/reading apparatus 1000, along with, for example, a title name or a chapter name, and can store the resultant information as tag list information in the database 604.

In the form of tag information, the title name exists as higher order data, and the tag list name exists as lower order data. Accordingly, a plurality of tag lists can be generated under one title name. For instance, users A and B can generate respective unique tag lists in accordance with their tastes.

The user terminal 700 includes a data transceiver 770, and a user operation processor 701. The operation signal generated by user's operation is detected by the user operation processor 701. The user terminal 700 includes a liquid crystal or LED display, and activates an operation screen when necessary. Various types of image content, editing of images (e.g., image enlargement, image contraction, etc.), and image switching, are controlled by a terminal screen display processor 702 in accordance with user's operation input. Further, phone signals are processed by a phone signal processor 703.

The user terminal 700 also comprises an image editing processor 711 and a time information processor 712. The image editing processor 711 enables the user to see the monitor 400, and simultaneously to read image information of a desired title from the memory of the recording/reading apparatus 1000 and edit the information, by means of the user terminal 700. Namely, the image editing processor 711 includes an application for transmitting a video editing request to the recording/reading apparatus 1000. Thus, the user terminal 700 can be operated as if the remote controller 1001 is operated. Editing processing enables content to be partially deleted or to be combined with other content.

The user terminal 700 can register, in a setting information processor (not shown), various devices to operate. The processing associated with setup information is mainly executed by the setting information processor. Further, applications for operating the registered devices are stored in an application file and managed by an application manager (not shown). The application manager can generate an application list.

The time information processor 712 is provided to detect a deviation of the time of outputting an image on the monitor 400, from the time of operating the user terminal 700, when the user terminal 700 is used to, for example, execute editing processing, or generate tag-associated information. For instance, assume that images A, B, C, D, E, F, G, H, I, . . . are output from the recording/reading apparatus 1000, and that when the image C is output, the user transmits, for example, a signal for suspending the above operation. The recording/reading apparatus 1000 receives and analyzes the signal, and then executes the suspension. In this case, the recording/reading apparatus 1000 may actually execute the suspension when the image F is output. This is because the signal is transmitted from the user terminal 700 to the apparatus 1000 via a network.

To avoid this, in this system, the user terminal 700 is designed to transmit absolute time information along with the suspension instructing signal. Similarly, the recording/reading apparatus 1000 is designed to transmit, to the user terminal 700, a response signal and absolute time information (indicating the time when suspension is executed) immediately after the suspension is actually executed. This absolute time information is monitored by the time information processor 231. The absolute time information indicates, for example, a current time point detected in common by the recording/reading apparatus 1000 and the user terminal 700.

Based on the difference between the absolute time information (indicating the time point when the operation for requesting suspension is executed) sent by the user terminal 700, and the absolute time information (indicating the time point when suspension is actually executed) sent from the recording/reading apparatus 1000, the user terminal 700 can obtain time difference information indicating the time required to actually execute suspension after the operation for requesting the suspension is executed. The user terminal 700 sends the time difference information to the recording/reading apparatus 1000. The recording/reading apparatus 1000 utilizes this information for image output. Namely, when executing subsequent suspension, the apparatus 1000 reads an image frame located at the position previous to the current position by the time difference, and outputs the read image frame as the frame located at the suspended position. Further, when time information is generated as information indicating a separation position (such as a chapter), the time difference information is used to determine a time advanced from the absolute time reported by the user terminal 700, and time information for a chapter is generated based on the advanced time. This time information is stored in the time information processor 231 and used for correcting a relative time period. The relative time period is an elapsed time period elapsing from the start of reading of content (the time of reading the beginning portion of the content is set to 0).

It is preferable that the outputs of clock circuits with an automatic time synchronizing function, contained in, for example, the recording/reading apparatus 1000 and the user terminal 700, be used as the absolute time.

Although in the above description, the user terminal 700 is a cell-phone, it may be a personal computer. Similarly, the data managing server 600 may be a personal computer.

FIG. 2 shows a process example, for acquiring information indicating the time difference between a request signal output time point at the user terminal 700 and an actual operation execution time point at the recording/reading apparatus 1000. More specifically, FIG. 2 shows absolute time points shared between the user terminal 700 and the recording/reading apparatus 1000. And FIG. 2 also shows the content reading history of the recording/reading apparatus 1000, and the time periods (relative time periods) elapsing from the start of reading of content in the recording/reading apparatus 1000.

Assume that the recording/reading apparatus 1000 is now reading contents. And the user terminal 700 has output a suspension request signal (assume that the elapsed reading time period is 1:003, and the absolute time point is 18:10: 003). This request signal reaches the recording/reading apparatus 1000 via the base station and the network. In the recording/reading apparatus 1000, the controller 212 analyzes the suspension request signal and instructs the read control processor 214 to execute suspension. As a result, reading operation is suspended (assume that the elapsed reading time period is 1:006, and the absolute time point is 18:10:006). The recording/reading apparatus 1000 executes the suspension, and then transmits a response signal to the user terminal 700.

In the above-described communication, since the suspension request signal reaches the recording/reading apparatus 1000 via the network, the frame read when the user terminal 700 determines suspension of reading differs from the frame read when the apparatus 1000 executes the suspension.

To detect the time difference, the user terminal 700 temporarily holds the absolute time point when the suspension request signal is output. On the other hand, when the suspension is executed, the recording/reading apparatus 1000 transmits information indicating the absolute time point of the execution to the user terminal 700, along with a response signal. As a result, the user terminal 700 detects the time difference between the time point of transmission of the suspension request signal and the time point of execution of suspension by the recording/reading apparatus 1000.

When the user terminal 700 accesses the recording/reading apparatus 1000 next time, it can transmit time difference information to the recording/reading apparatus 1000, along with a request signal. The recording/reading apparatus 1000 can detect that the time point when the request signal reaches is actually the time point advanced by the time difference.

In the above description, to acquire time difference information, the time point of generating the suspension request signal by the user terminal, and the time point of executing suspension by the recording/reading apparatus are utilized. However, the invention is not limited to this, but various methods can be used. For instance, it is sufficient if a request time point (such as a read request time point) in the user terminal 700, and an execution time point (such as an execution time point of reading responsive to the read request) in the recording/reading apparatus 1000 can be detected in the absolute time domain.

Referring now to FIG. 3, a description will be given of exchange of information between the user terminal 700 and the recording/reading apparatus 1000, and data processing executed in these devices. In the user terminal 700, a menu image is displayed. When a communication destination item is selected from the menu image, equipment identification information, which includes the recording/reading apparatus, the television receiver, etc., registered in the user terminal 700, is displayed. At this time, if the user selects the recording/reading apparatus 1000 from the equipment identification information, communication with the recording/reading apparatus 1000 is permitted (steps or blocks SA1 and SA2).

Upon receiving a read request from the user terminal 700, the recording/reading apparatus 1000 starts reading (steps or blocks SA3 and SB1) under the control of the controller 212. Before reading, a menu of title names of content readable in the recording/reading apparatus 1000 is displayed on, for example, the monitor 400 (or on the user terminal) to permit the user to designate a desired one (the step or block of this processing is omitted in the figure).

Assume here that reading of content is started, a response signal is transmitted to the user terminal 700, and the user terminal 700 recognizes the response signal. Assume also that the user has operated the user terminal 700 while seeing the image on the monitor 400, so as to send a suspension request at an arbitrary time. At this time, the user terminal 700 sends the suspension request and holds information indicating absolute time point A of the operation.

Upon receiving the suspension request, the recording/reading apparatus 1000 executes suspension, and sends, to the user terminal 700, a response signal and information indicating absolute time point B of executing the suspension (step or block SB2). Upon receiving the information indicating the absolute time point B, the user terminal 700 calculates (B-A) to detect the time difference between the operation and the execution (step or block SA5).

The user terminal 700 sends, to the recording/reading apparatus 1000, a read request signal as well as a skip back request signal, a setup signal as a read condition (e.g., normal reading, high-speed reading, etc.), and the time difference information. In the recording/reading apparatus 1000, the tag list managing unit 225 and the read controller 214 mainly operate. In response to the skip back request signal, the recording/reading apparatus 1000 skips back to the start position of content, and starts reading in accordance with the read condition (step or block SB3). And the time difference information is stored (step or block SB3). The recording/reading apparatus 1000 checks whether a tag generation request signal has reached, while executing reading of the content (step or block SB4). Upon receiving the tag generation request signal, it is determined whether tag start time point information is already generated and stored in a predetermined register (step or block SB5). If the tag start time information is not generated, it is generated and held in a temporary register. The tag start time information indicates the time obtained by subtracting the aforementioned time difference from the time period elapsing from the start of reading of the content till the currently read frame. Namely, the time period elapsing from the start of reading of the content till the currently read frame of the content is corrected by the time difference information, and the corrected time information is set as the tag start time information and temporarily held in a register. Subsequently, reading of the content is continued. If there is another tag setting request (step or block SB4), the processing proceeds to step or block SB7. At step or block SB7, the time period elapsing from the start of reading of the content till the currently read frame of the content is corrected by the time difference information, and the corrected time information is set as the tag end time information and temporarily held in the register.

Respective tag numbers, and tag list numbers or tag list names (such as company names that can be arbitrarily set using text data) are assigned to the tag start and end time information items, and resultant information is externally output as tag association information. The transmission processing is executed by the network controller 300. The transmission destination is the user terminal 700 or the data managing server 600. Upon receiving the tag association information, the user terminal 700 or the data managing server 600 can construct a tag list (steps or blocks SB8 and SA7).

The tag list may be temporarily constructed in the memory 120 by the tag list managing unit 225 in the recording/reading apparatus 1000. The constructed tag list may be transmitted to, for example, the data managing server 600 under the control of the controller 212. The data managing server 600 sends the received tag list to the database 604 via a tag list managing unit 603 to store the list therein.

After finishing the processing at the step or block SB8, information indicating the tag set time and temporarily stored is cleared (step or block SB9), and it is determined whether the entire content has been read (step or block SB9). If it is determined that the entire content has been read, the processing is finished, whereas if to-be-read part of the content remains, the processing returns to step or block SB4, where the above-described tag list generation is continued.

In the above description, the start and end times in the tag list are generated based on user operations. However, the invention is not limited to this, but may be modified such that only the start time is designated by a user operation, and the end time is automatically determined. In this case, a menu of tag information processing methods is prepared in the user terminal 700. The menu image data is processed by a terminal screen display processor 702.

For instance, if a tag generation item is selected from the menu, items "both tag start and end times are determined by user operations" and "only tag start time is determined by a user operation" are displayed. If the item "only tag start time is determined by a user operation" is selected, item "the interval between the tag start time and the tag end time is automatically set to (00:00:00)" is displayed. As a result, the user can set the interval between the tag start time and the tag end time.

In the above-described apparatus, the completed tag list is stored in, for example, the data managing server 600. The tag list can be used not only by the above-mentioned user (first user), but also by another user (second user). If the second user owns a user terminal (second user terminal) similar to the above-mentioned user terminal, and registers, in the second user terminal, identification information of the recording/reading apparatus 1000, the data managing server 600, etc., they can control these devices like the first user.

Assume here that the second user wishes to use a tag list 1 stored in the data managing server 600 to read a title 1 from the recording/reading apparatus 1000. In this case, if the second user acquires menu information from the tag list managing unit 603 in the data managing server 600 to select a desired tag list (tag list 1), the tag list 1 is transmitted to the recording/reading apparatus 1000. After that, if the tag list read mode is designated to thereby send a read request signal to the recording/reading apparatus 1000, the recording/reading apparatus 1000 starts reading based on the tag list 1.

As described above, in the system, the tag list 1 generated by the user 1 is stored in the external data managing server 600. This enables another user 2 to use the tag list 1 simply by accessing the data managing server 600, namely, the user 2 does not have to newly generate a tag list.

Alternatively, however, when a tag list is being generated, it may be temporarily stored in the recording/reading apparatus 1000, and be transmitted and stored in the data managing server 600 after it is completed. Yet alternatively, when a tag list is being generated, it may be temporarily stored in the memory of the user terminal 700, and be transmitted and stored in the external data managing server 600 after it is completed. Furthermore, the user terminal 700 can designate the data managing server 600 as a tag list constructing unit. In this case, whenever tag association information is generated for a tag list in the recording/reading apparatus 1000, it may be transmitted to the data managing server 600, and the tag list may be completed in the data managing server 600.

FIG. 4 is a flowchart useful in explaining another operation example. The recording/reading apparatus 1000 and the data managing server 600 receive respective activation command signals from the user terminal 700 and are activated (steps of blocks SG1, SG2, SE0 and SF0). At this time, the data managing server 600 is ready for tag list generation. The recording/reading apparatus 1000 and the user terminal 700 mutually acquire the aforementioned time difference information by communication with each other (step or block SG3).

The user terminal 700 transmits a read request to the recording/reading apparatus 1000, which, in turn, starts reading of selected content (step or block SG4, SE1). The user watches read images on the monitor 400. When an image for which the user wants to set a tag is displayed, they execute a tag request operation for designating the start time of the tag (step or block SG5).

Upon receiving the tag request, the recording/reading apparatus 1000 generates tag association information and transmits the same to the data managing server 600 (steps or blocks SE1, SE2, SE3 and SE4). After that, the recording/reading apparatus 1000 determines whether reading of the content is finished (step or block SE5). If it is not finished, the processing returns to the step or block SE1, where reading of the content is continued.

On the other hand, the data managing server 600, which has received the tag association information, constructs a tag list (steps of blocks SF1 and SF2). The user operates the user terminal 700 to execute a tag request operation and specify the start and end points of a tag. Until the reading of the content finishes, the user can generate a desired number of tags. The user may choose the start and end points of a commercial as the tag start and end points. Alternatively, they may choose the start and end points of a musician of their type as the tag start and end points. Yet alternatively, the time when a news caster of their type appears on the screen may be chosen as a tag start point, and the time when the caster disappears from the screen be chosen as a tag end point.

After finishing the reading of the content, the recording/reading apparatus 1000 informs the data managing server 600 and the user terminal 700 of the completion of the content reading. Upon receiving information indicating that the content reading has finished, the data managing server 600 holds the constructed tag list (steps or blocks SF3 and SF4). Similarly, upon receiving the information, the user terminal 700 finishes the tag list generation mode, and shifts to a standby state for the next operation (steps or blocks SG6 and SG7).

In the above description, tags are generated when the recording/reading apparatus 1000 reads content. However, tags can also be generated when the recording/reading apparatus 1000 receives a broadcast signal and records decoded video information in a memory medium. In this case, however, the tags are generated for a real-time video signal, skip back reading is impossible.

Figure 5:
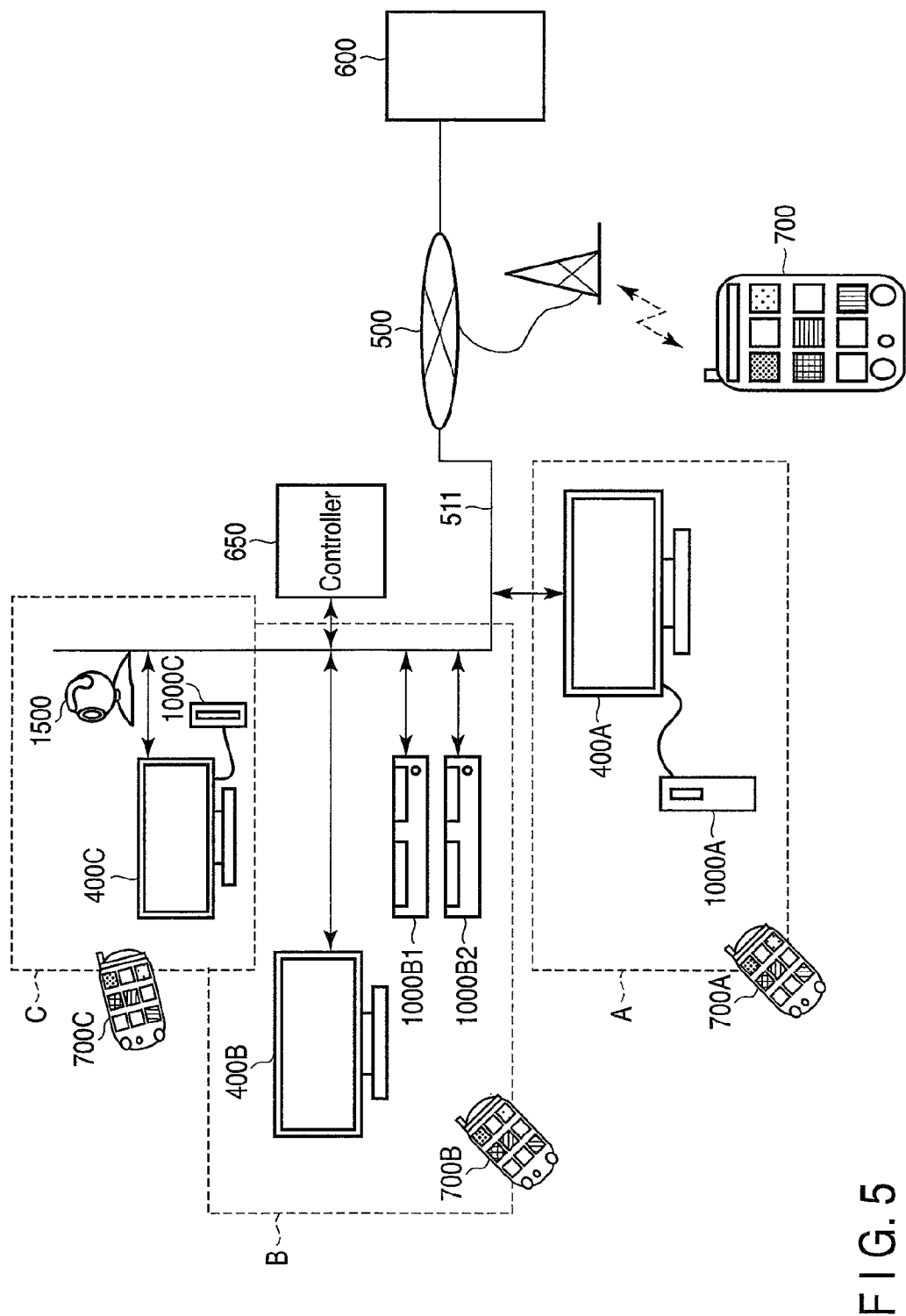
FIG. 5 is a block diagram illustrating another embodiment.

FIG. 5 shows an environment example in which the above-described apparatus is employed. The network 500 may be a home network or an external network. Assume here that a LAN 511 for user's home is installed, which connects all rooms. Also assume that a television receiver 400A is installed in a room A, and a recording/reading apparatus 1000A having a hard disk drive is connected to the television receiver 400A. Further, in a room B, the television receiver 400B and recording/reading apparatuses 1000B1 and 1000B2 are installed. The television receiver 400B is also used as a monitor as in the case of FIG. 1. Furthermore, in a room C, a television receiver 400C is installed, and a recording/reading apparatus 1000C having a hard disk drive is connected to the television receiver 400C. An image pickup camera 1500 is also installed in the room C.

The above-mentioned devices are connected to the home LAN 511, and the user terminal 700 registers identification information on the devices. Accordingly, the user terminal 700 can designate a desired device using the identification information, and operate the designated device. All rooms may be provided with their respective user terminals 700. A user terminal 700A may be owned by a person who uses a room A, a user terminal 700B be owned by a person who uses a room B, and a user terminal 700C be owned by a person who uses a room C.

The home LAN 511 is connected to a controller 650 for performing, for example, power supply control of the devices in the house, and adjustment for data transmission and reception.

Assume that device identification information items on the television receivers 400A and 400B, the recording/reading apparatuses 1000A, 1000B1 and 1000B2, the data managing server 600 are registered in the user terminal 700. By virtue of this structure, the user terminal 700 can control these devices (for example, to turn on and off the television receiver 400A or to switch the channel thereof) by designating corresponding device identification information and sending a control signal.

The data managing server 600 may be installed either in the house or at a remote place outside the house.

When the user terminal 700 accesses each device via an external base station, or directly accesses the television receiver 400 using an infrared ray, an image, to which the user wants to attach a tag, may deviate from an image in the receiver or the recording/reading apparatus, to which the tag is actually attached, because of a delay in the user operation or because of the influence of the line network. The embodiment can avoid such deviation.

By virtue of the above structure, if a tag list is stored in, for example, the data managing server 600, the users of the above-mentioned user terminals can access the list using the respective user terminals.

Further, the devices connected via the network may employ any communication scheme or any combination of communication schemes. Each device has its IP address, and also has an authentication function.

Furthermore, time difference information may be acquired at any time during generation of a tag list. When the time difference information is acquired, already set tag start and end times may be corrected at a time based on the time difference information, and subsequent tag start and end times be sequentially corrected based on the time difference information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recording/reading apparatus comprising:
    a control block, the control block comprising a read control processor configured to read designated content, and a time information processor configured to process time information, wherein the control block comprises:
    means for transmitting a response signal and a second absolute time point, wherein the second absolute time point is a time point of an operation being executed in response to an operation request signal generated by the user terminal operated by a user at a first absolute time point, the operation request signal sent via a network;
    means for storing time difference information from the user terminal, the time difference information indicating a time difference between the first absolute time point which is an operating time point of the user terminal, and the second absolute time point; and
    means for setting tag time information by correcting, using the time difference information and a current relative time period for which the designated content is read, when responding to a further request signal which instructs to make a tag, sent from the user terminal via the network.

2. The recording/reading apparatus of claim 1, further comprising a means for transmitting the tag time information to an external data managing server when the tag time information is generated.

3. The recording/reading apparatus of claim 1, wherein the control block further includes a tag list managing unit managing a tag list, and is configured to generate the tag list into the tag list managing unit, and transmit the tag list to an external data managing server when the tag list is completed.

4. A control method of controlling a recording/reading apparatus comprising a control block, the control block comprising a read control processor configured to read designated content, and a time information processor configured to process time information, the control method comprising steps of:
    transmitting a response signal and a second absolute time point, wherein the second absolute time point is a time point of an operation being executed in response to an operation request signal generated by the user terminal operated by a user at a first absolute time point, the operation request signal sent via a network;
    storing time difference information from the user terminal, the time difference information indicating a time difference between the first absolute time point which is an operating time point of the user terminal, and the second absolute time point; and
    setting tag time information by correcting, using the time difference information, a current relative time period for which the designated content is read, when responding to a further request signal which gives an instruction to make a tag, sent from the user terminal via the network.

5. The control method of claim 4, wherein the control block transmits the tag time information to an external data managing server when the tag time information is generated.

6. The control method of claim 4, wherein the control block generates a tag list into the tag list managing unit, and transmits the tag list to an external data managing server when the tag list is completed.

7. A control device for recording/reading apparatus comprising:
    the recording/reading apparatus comprising:
    a control block, the control block comprising a read control processor configured to read designated content, and a time information processor configured to process time information, wherein the control block comprises:
    means for transmitting a response signal and a second absolute time point, wherein the second absolute time point is a time point of an operation being executed in response to an operation request signal generated by the user terminal operated by a user at a first absolute time point, the operation request signal sent via a network;
    means for storing time difference information from the user terminal, the time difference information indicating a time difference between the first absolute time point which is an operating time point of the user terminal, and the second absolute time point, and
    means for setting, as tag time information, the tag time information obtained by correcting, using the time difference information, a current relative time period for which the designated content is read, when responding to a further request signal which instructs to make a tag, sent from the user terminal via the network; and
    the user terminal configured to control the recording/reading apparatus, the user terminal comprising:
    means for transmitting the operation request signal;
    means for storing the information indicating the first absolute time point at the operation request signal being transmitted;
    means for detecting the time difference between the first absolute time point and the second absolute time point to generate the time difference information; and
    means for transmitting the generated time difference information to the recording/reading apparatus.

8. The control device for recording/reading apparatus of claim 7, wherein the user terminal comprises a function as a phone.

9. The control device for recording/reading apparatus of claim 7, wherein the user terminal is a personal computer.

* * * * *